US012272495B2

(12) United States Patent
Choi et al.

(10) Patent No.: US 12,272,495 B2
(45) Date of Patent: Apr. 8, 2025

(54) SYSTEMS AND METHODS FOR IMPROVED SUPERCAPACITORS WITH IONIC LIQUID ELECTROLYTES

(71) Applicant: The Regents of the University of Michigan, Ann Arbor, MI (US)

(72) Inventors: Saemin Choi, Ann Arbor, MI (US); Abdoulaye Djire, Ann Arbor, MI (US); Levi T. Thompson, Superior Township, MI (US)

(73) Assignees: The Regents of the University of Michigan, Ann Arbor, MI (US); INMATECH INC., Ann Arbor, MI (US)

( * ) Notice: Subject to any disclaimer, the term of this patent is extended or adjusted under 35 U.S.C. 154(b) by 435 days.

(21) Appl. No.: 16/839,221

(22) Filed: Apr. 3, 2020

(65) Prior Publication Data

US 2020/0321165 A1    Oct. 8, 2020

Related U.S. Application Data

(60) Provisional application No. 62/829,890, filed on Apr. 5, 2019.

(51) Int. Cl.
*H01G 11/62* (2013.01)
*H01G 11/02* (2013.01)
*H01G 11/30* (2013.01)
*H01G 11/84* (2013.01)

(52) U.S. Cl.
CPC ............ *H01G 11/62* (2013.01); *H01G 11/02* (2013.01); *H01G 11/30* (2013.01); *H01G 11/84* (2013.01)

(58) Field of Classification Search
None
See application file for complete search history.

(56) References Cited

U.S. PATENT DOCUMENTS

| 5,680,292 A | 10/1997 | Thompson, Jr. et al. |
| 5,837,630 A | 11/1998 | Owens et al. |
| 9,384,905 B2 | 7/2016 | Thompson et al. |
| 2008/0192407 A1* | 8/2008 | Lu ................. H01G 11/36 252/62.2 |
| 2008/0226986 A1* | 9/2008 | Nakahara ........... H01M 4/624 429/213 |
| 2011/0183180 A1 | 7/2011 | Yu et al. |

(Continued)

FOREIGN PATENT DOCUMENTS

WO    WO-2019043320 A1 *    3/2019    ........... C01B 32/158

OTHER PUBLICATIONS

Djire et al., Enhanced Performance for Early Transition Metal Nitrides via Pseudocapacitance in Protic Ionic Liquid Electrolytes, Electrochemistry Communications, 2017, 77:19-23.

(Continued)

*Primary Examiner* — Dion R. Ferguson
(74) *Attorney, Agent, or Firm* — Quarles & Brady LLP

(57) ABSTRACT

Disclosed are systems and methods for a supercapacitor. One form of the supercapacitor has a first electrode comprising a first active material, a second electrode comprising a second active material, and an electrolyte comprising a protic ionic liquid. The protic ionic liquid may be capable of undergoing a faradaic charge transfer with an electrode of a supercapacitor.

30 Claims, 3 Drawing Sheets

(56) References Cited

U.S. PATENT DOCUMENTS

| | | | | |
|---|---|---|---|---|
| 2013/0189586 A1* | 7/2013 | Sarrazin | ............... | H01M 4/668 205/108 |
| 2014/0321093 A1* | 10/2014 | Pande | ................... | H01G 11/84 29/25.03 |
| 2019/0352190 A1* | 11/2019 | Dryfe | .................. | C01G 39/006 |
| 2020/0227210 A1* | 7/2020 | Descarpentries | ..... | C01B 32/162 |

OTHER PUBLICATIONS

Eustache et al., Asymmetric Electrochemical Capacitor Microdevice Designed with Vanadium Nitride and Nickel Oxide Thin Film Electrodes, Electrochemistry Communications, 2013, 28:104-106.

Gao et al., Spherical Porous VN and NiOx as Electrode Materials for Asymmetric Supercapacitor, Electrochimica Acta, 2013, 87:375-380.

Jiang et al., Definitions of Pseudocapacitive Materials: A Brief Review, Energy & Environmental Materials, 2019, 2:30-37.

Ketabi et al., Proton Conducting Ionic Liquid Electrolytes for Liquid and Solid-State Electrochemical Pseudocapacitors, Solid State Ionics, 2016, 298:73-79.

Lin et al., Capacitance of Ti3C2Tx MXene in Ionic Liquid Electrolyte, Journal of Power Sources, 2016, 326:575-579.

Mysyk et al., Pseudo-Capacitance of Nanoporous Carbons in Pyrrolidinium-Based Protic Ionic Liquids, Electrochemistry Communications, 2010, 12:414-417.

Nguyen et al., Electrochemistry of Ruthenium Dioxide Composite Electrodes in Diethylmethylammonium-Triflate Protic Ionic Liquid and Its Mixtures with Acetonitrile, Electrochimica Acta, 2014, 147:96-103.

Pande et al., Charge Storage on Nanostructured Early Transition Metal Nitrides and Carbides, Journal of Power Sources, 2012, 207:212-215.

Rochefort et al., Pseudocapacitive Behaviour of RuO2 in a Proton Exchange Ionic Liquid, Electrochemistry Communications, 2006, 8(9):1539-1543.

Wikipedia, "Supercapacitor", Apr. 3, 2019, 56 pages.

Wu et al., High-Energy MnO2 Nanowire/Graphene and Graphene Asymmetric Electrochemical Capacitors, ACS Nano, 2010, 4(10):5835-5842.

PCT International Search Report and Written Opinion, PCT/US2020/026518, Jun. 29, 2020, 13 pages.

Watanabe et al., "Application of Ionic Liquids to Energy Storage and Conversion Materials and Devices", Chem. Rev. 2017, 117, 10, 7190-7239.

\* cited by examiner

SYSTEMS AND METHODS FOR IMPROVED SUPERCAPACITORS WITH IONIC LIQUID ELECTROLYTES

CROSS-REFERENCES TO RELATED APPLICATIONS

This application is based on and claims priority to U.S. Provisional Patent Application No. 62/829,890, filed Apr. 5, 2019, which is hereby incorporated by reference herein in its entirety for all purposes.

STATEMENT REGARDING FEDERALLY SPONSORED RESEARCH

Not Applicable.

FIELD OF THE INVENTION

This invention relates to electrochemical devices, such as capacitors. More specifically, this invention relates to supercapacitors.

BACKGROUND

Secondary batteries in use today are typically optimized for energy storage and lack efficient peak power capabilities, which accounts on average for about 30% of the storage capacity demand. While batteries can have energy densities exceeding 100 Wh/kg, this energy is difficult to fully access in pulsed and high power applications due to the relatively slow kinetics associated with the redox processes of batteries.

Supercapacitors, another type of energy storage device, have excellent power capabilities that could complement batteries, but are currently cost prohibitive, and limited by their modest energy density for mass market penetration. Supercapacitors have high energy densities compared to traditional capacitors, due to their charge storage mechanisms. In addition to charge storage during formation of an electrical double layer, a significant portion of the energy may be from fast, reversible redox reactions taking place near the electrode surface. Supercapacitors provide higher power than batteries, while storing less energy.

Cost effective, high performance energy storage is key to reducing the dependency from foreign oil and securing our future energy supply. It reaches all areas of our daily life from mobile electronics and transportation to industrial production and smart grid. Lower supercapacitor cost ($1~2/Wh) is expected to accelerate penetration of the multi-billion dollar market for efficient peak power management in transportation (e.g., plug-in hybrid electric vehicles and electric vehicles), light rail regenerative braking, as well as frequency regulation and peak load leveling for smart grids with increased integration of solar and wind energy.

When supercapacitors are used in conjunction with batteries, the range of electric vehicles (EVs) can be extended up to 2 times and fuel efficiency of hybrid vehicles can be improved up to 40%. This reduces the oil imports from foreign countries and respectively reduces transportation related emissions. Despite their proven performance benefits, supercapacitors have not found widespread commercial use, largely due to the need for higher energy densities and lower cost.

Therefore, there is an unmet need for supercapacitor configurations and materials that provide improved energy density while remaining cost-effective.

SUMMARY OF THE INVENTION

The present disclosure provides systems and methods for improved electrochemical supercapacitors that have electrolytes comprising an ionic liquid capable of fostering pseudocapacitance. The ionic liquid (IL) based electrolytes described herein may be specifically tailored to the electrode active materials, enabling higher operating voltages than conventional supercapacitors with aqueous based electrolytes, producing significantly increased energy densities, and reducing the number of cells (per module) and, as a result, the implementation costs. In some aspects, the electrolyte may foster pseudocapacitance based on the reversible redox reaction between the electrode and hydroxyl moieties of the ionic liquid.

In one aspect, the present disclosure provides a supercapacitor comprising: a first electrode comprising a first active material; a second electrode comprising a second active material; and an electrolyte comprising a protic ionic liquid. The first active material can comprise a pseudocapacitive material. The second active material can comprise a pseudocapacitive material. The second active material can be an electrical double layer capacitive material. The second active material can comprise activated carbon. The second active material can be a redox capacitive material. The second active material can comprise a metal oxide. The second active material can be a battery-type electrode material.

In one version of the supercapacitor, the first active material comprises a metal selected from the group consisting of molybdenum, vanadium, titanium, manganese, and ruthenium. The first active material can comprise vanadium nitride. The first active material can comprise a material selected from the group consisting of metal oxides, metal carbides, metal nitrides, polymeric materials, 2D transition metal dichalcogenides, 2D MXenes, and carbon. The first active material can comprise a 2D MXene selected from the group consisting of two-dimensional titanium nitride, two-dimensional titanium carbide, and two dimensional vanadium nitride. The first active material can have a specific surface area of 40 $m^2/g$ or greater.

In one version of the supercapacitor, the first electrode has a first operating window, the second electrode has a second operating window, and the total operating window for the supercapacitor is greater than 3 volts. The total operating window for the supercapacitor can be 3.6 volts or greater.

In one version of the supercapacitor, the electrolyte comprises a compound having at least one hydroxyl moiety. The electrolyte can comprise an organic solvent. The electrolyte can comprise a solvent selected from the group consisting of acetonitrile, propylene carbonate, dimethyl carbonate, dimethyl sulphoxide, ethylene carbonate, 1,2-dimethoxy ethane, and mixtures thereof.

In one version of the supercapacitor, the electrolyte comprises a compound selected from the group consisting of
1-ethyl-3-methylimidazolium bis (fluorosulfonyl) imide (EMIM FSI),
1-methylimidazolium acetate,
2-methylpyridine, trifluoroacetic acid,
1-[(2-methacryloyloxy)ethyl]-3-butylimidazolium hydroxide (MEBIm-OH),
methyl methacrylate (MMA),
choline hydroxide ([OH—$(CH_2)_2$—$NMe_3$]$^+$OH$^-$),
1-alkyl-3-methylimidazolium hydroxides,
tetra-n-butylphosphonium hydroxide,
1-butyl-3-methyl imidazolium hydroxide ([bmim]OH),
1-ethyl-3-methylimidazolium hydroxide ([emim]OH),
and mixtures thereof.

In one version of the supercapacitor, the supercapacitor is an asymmetric supercapacitor. The supercapacitor can further comprise a separator disposed between the first electrode and the second electrode. At least a part of the electrolyte can be interposed between and contacting both the first electrode and the second electrode. The supercapacitor can have a maximum energy density of 20 Wh/kg or greater. The supercapacitor can have a maximum energy density of 50 Wh/kg or greater. The supercapacitor can have a coulombic efficiency of at least 80%. The supercapacitor can have a coulombic efficiency of at least 90%.

In another aspect, the present disclosure provides a supercapacitor comprising: an electrode; and an ionic liquid electrolyte comprising a protic ionic liquid capable of undergoing a faradaic charge transfer with the electrode. The protic ionic liquid can comprise a compound having at least one hydroxyl moiety or protons. The ionic liquid electrolyte can further comprise an organic solvent. The ionic liquid electrolyte can further comprise a solvent selected from the group consisting of acetonitrile, propylene carbonate, dimethyl carbonate, dimethyl sulphoxide, ethylene carbonate, 1,2-dimethoxy ethane, and mixtures thereof.

The protic ionic liquid can comprise a compound selected from the group consisting of
1-ethyl-3-methylimidazolium bis (fluorosulfonyl) imide (EMIM FSI),
1-methylimidazolium acetate,
2-methylpyridine, trifluoroacetic acid,
1-[(2-methacryloyloxy)ethyl]-3-butylimidazolium hydroxide (MEBIm-OH),
methyl methacrylate (MMA),
choline hydroxide ([OH—$(CH_2)_2$—$NMe_3]^+OH^-$),
1-alkyl-3-methylimidazolium hydroxides,
tetra-n-butylphosphonium hydroxide,
1-butyl-3-methyl imidazolium hydroxide ([bmim]OH),
1-ethyl-3-methylimidazolium hydroxide ([emim]OH),
and mixtures thereof.

In one version of the supercapacitor, the electrode comprises a pseudocapacitive material. The pseudocapacitive material can comprise a metal selected from the group consisting of molybdenum, vanadium, titanium, manganese, and ruthenium. The pseudocapacitive material can have a specific surface area of 40 $m^2/g$ or greater. The pseudocapacitive material can comprise vanadium nitride. The electrode can comprise a material selected from the group consisting of metal oxides, metal carbides, metal nitrides, polymeric materials, 2D transition metal dichalcogenides, 2D MXenes, and carbon. The electrode can comprise a 2D MXene selected from the group consisting of two-dimensional titanium nitride, two-dimensional titanium carbide, and two dimensional vanadium nitride.

In one version of the supercapacitor, the supercapacitor has a maximum energy density of 20 Wh/kg or greater. The supercapacitor can have a maximum energy density of 50 Wh/kg or greater. The supercapacitor can have a coulombic efficiency of at least 80%.

In yet another aspect, the present disclosure provides a method of making an ionic liquid electrolyte. The method comprises combining an ionic liquid and a solvent to form a protic ionic liquid electrolyte capable of undergoing a faradaic charge transfer with an electrode of a supercapacitor. The ionic liquid can comprise a compound having at least one hydroxyl moiety or protons. The solvent can be an organic solvent. The solvent can be selected from the group consisting of acetonitrile, propylene carbonate, dimethyl carbonate, dimethyl sulphoxide, ethylene carbonate, 1,2-dimethoxy ethane, and mixtures thereof. The ionic liquid can comprise a compound selected from the group consisting of
1-ethyl-3-methylimidazolium bis (fluorosulfonyl) imide (EMIM FSI),
1-methylimidazolium acetate,
2-methylpyridine, trifluoroacetic acid,
1-[(2-methacryloyloxy)ethyl]-3-butylimidazolium hydroxide (MEBIm-OH),
methyl methacrylate (MMA),
choline hydroxide ([OH—$(CH_2)_2$—$NMe_3]^+OH^-$),
1-alkyl-3-methylimidazolium hydroxides,
tetra-n-butylphosphonium hydroxide,
1-butyl-3-methyl imidazolium hydroxide ([bmim]OH),
1-ethyl-3-methylimidazolium hydroxide ([emim]OH),
and mixtures thereof.

In the method, the ionic liquid and the solvent can be combined in a volume ratio of 1:10 to 10:1, or in a volume ratio of 1:5 to 5:1, or in a volume ratio of 1:2 to 2:1.

The foregoing and other aspects and advantages of the invention will appear from the following description. In the description, reference is made to the accompanying drawings which form a part hereof, and in which there is shown by way of illustration an example embodiment of the invention. Such embodiment does not necessarily represent the full scope of the invention, however, and reference is made therefore to the claims and herein for interpreting the scope of the invention.

BRIEF DESCRIPTION OF DRAWINGS

FIG. 3A shows cyclic voltammograms for the vanadium nitride (VN) and activated carbon (AC) electrodes; FIG. 3B shows the corresponding cell voltage as a function of time for the VN-AC system; and FIG. 3C shows energy density and coulombic efficiency for the VN-AC system.

Figure 1:
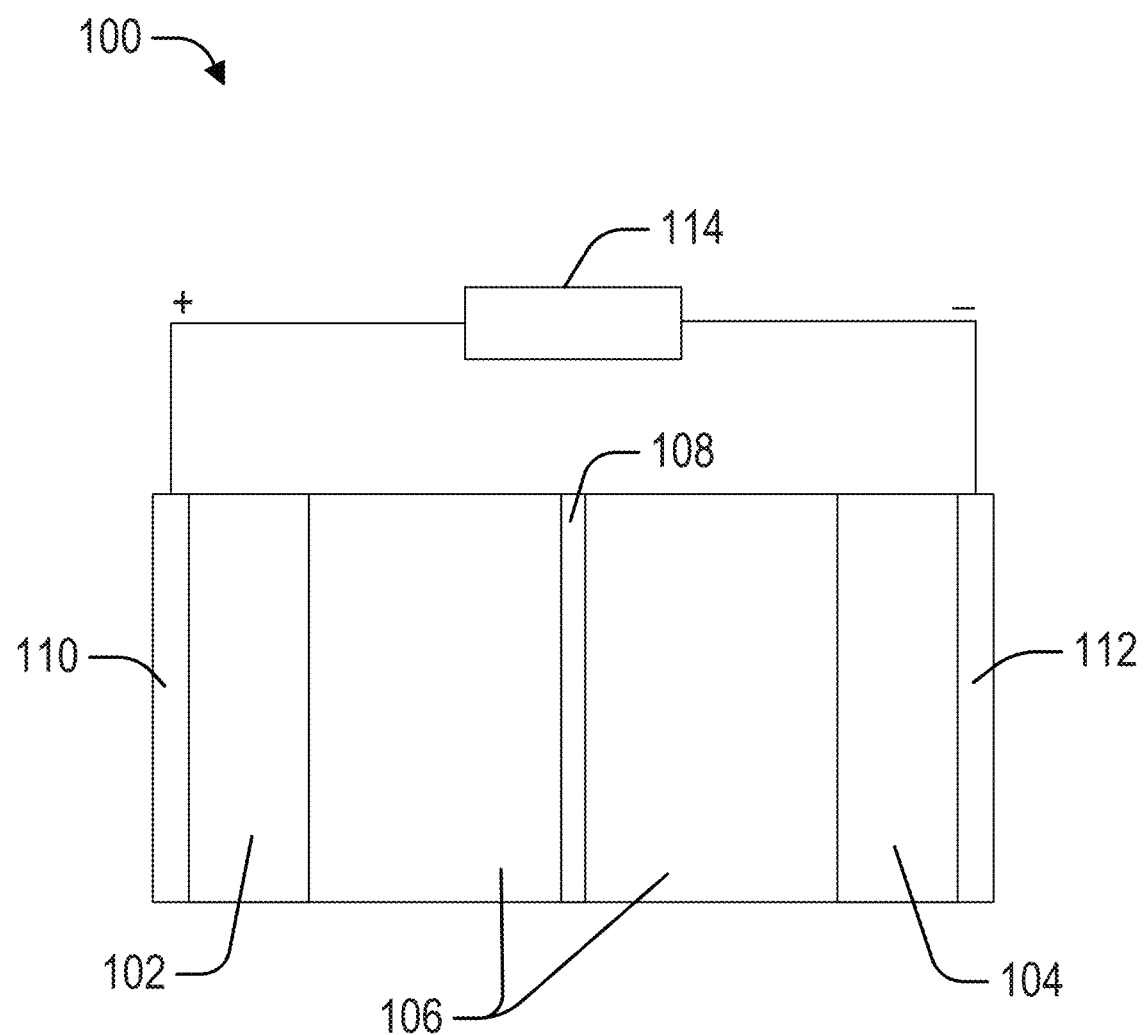
FIG. 1 is an exemplary schematic depiction of a supercapacitor, in accordance with one aspect of the present disclosure.

The invention will be better understood and features, aspects and advantages other than those set forth above will become apparent when consideration is given to the following detailed description thereof. Such detailed description makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

As used herein, "supercapacitor" (also referred to as a "supercap", "ultracapacitor", or "goldcap") has its common meaning and can be used to describe an electrochemical capacitor having two electrodes separated by an electrolyte ionically connecting both electrodes As used herein, "aqueous based electrolyte" or "aqueous electrolyte" has its common meaning and generally refers to an electrolyte solution in which the solvent is water.

As used herein, "ionic liquid" has its common meaning and generally refers to a salt in a liquid state. In some aspects, the term may generally be restricted to salts whose melting point is below a specified temperature, such as 200° C., 150° C., 100° C., 50° C., or to salts that are generally considered to be liquids near room temperature.

As used herein, an "asymmetric supercapacitor" has its common meaning and refers to a capacitor that utilizes two different storage mechanisms—electrical double layer capacitance and pseudocapacitance. For example, the first active material can be a pseudocapacitive material, while the second electrode can be an electrical double layer capacitive material.

As used herein the "operating window of an electrode" refers to the maximum voltage range in which the electrode can be stably cycled. A cyclic voltammogram provides the operating window by plotting current as function of voltage. As used herein the "operating window of a supercapacitor," also referred to herein as the "total operating windows" refers to the combined operating window of the electrodes, which spans from the lowest operating voltage of one of the electrodes to the highest operating voltage of one of the electrodes. As used herein an "overlap of operating windows" refers to the voltage range in which both electrodes can be cycled. The percent of overlap is determined by dividing the voltage range of overlap by the total voltage range of the supercapacitor (i.e., the total operating window).

FIG. 1 depicts is an exemplary schematic depiction of a supercapacitor 100. The supercapacitor has a first electrode 102 comprising a first active material, a second electrode 104 comprising a second active material, an ionic liquid electrolyte 106, and a separator 108 disposed between the first and second electrodes. A first current collector 110 and a second current collector 112 form an electrical connection with a voltage source 114.

The ionic liquid electrolyte 106 may foster pseudocapacitance in either the first electrode 102, the second electrode 104, or both. The ionic liquid electrolyte may comprise a protic ionic liquid solution. The ionic liquid electrolyte may consist essentially of a protic ionic liquid solution. The ionic liquid electrolyte may consist of a protic ionic liquid solution. The protic ionic liquid solution may comprise hydroxyl species that foster pseudocapacitance. The protic ionic liquid solution may comprise protons that foster pseudocapacitance. The ionic liquid electrolyte may include one or more aprotic ionic liquid solutions mixed with the protic ionic liquid solution. Because the electrolytes of pseudocapacitors and hybrid capacitors participate in redox reactions at the electrode/electrolyte interface, the capacitance can significantly vary based on the type of electrode and electrolyte used. Without being bound by theory, the presence of hydroxyl species in the ionic liquid electrolyte allow for the utilization of the near complete potential of various electrode active materials, such as vanadium nitride.

The ionic liquid electrolyte 106 may comprise a compound having at least one hydroxyl moiety or protons. The ionic liquid electrolyte may comprise a compound selected from the group consisting of 1-ethyl-3-methylimidazolium bis (fluorosulfonyl) imide (EMIM FSI),
1-methylimidazolium acetate,
2-methylpyridine, trifluoroacetic acid,
1-[(2-methacryloyloxy)ethyl]-3-butylimidazolium hydroxide (MEBIm-OH),
methyl methacrylate (MMA),
choline hydroxide ([OH—$(CH_2)_2$—$NMe_3$]$^+OH^-$),
1-alkyl-3-methylimidazolium hydroxides,
tetra-n-butylphosphonium hydroxide,
1-butyl-3-methyl imidazolium hydroxide ([bmim]OH),
1-ethyl-3-methylimidazolium hydroxide ([emim]OH),
and mixtures thereof.

The ionic liquid electrolyte 106 may comprise a solvent. The solvent may be aqueous or non-aqueous (i.e. organic). The solvent may be selected from the group consisting of acetonitrile, propylene carbonate, dimethyl carbonate, dimethyl sulphoxide, ethylene carbonate, 1,2-dimethoxy ethane, and mixtures thereof. The ionic liquid electrolyte 106 may be interposed between and contacting both the first electrode 102 and the second electrode 104.

The first active material of the first electrode 102 may comprise a pseudocapacitive material. The first active material may be a metal oxide, such as ruthenium(IV) oxide or manganese dioxide. Alternatively, the first active material may be a metal carbide, such as molybdenum carbide or titanium carbide. The first active material may be a metal nitride, such as vanadium nitride, molybdenum nitride, or titanium nitride. The first active material be a polymer, such as polyaniline, polypyrrole, or polythiophene. The first active material may be a two-dimensional (2D) transition metal dichalcogenide. The first active material may be a 2D MXene, such as two-dimensional titanium nitride ($Ti_4N_3$), two-dimensional titanium carbide ($Ti_3C_2$), or two dimensional vanadium nitride ($V_2N$). The first active material may comprise carbon, such as graphene, graphite, or carbon nanotubes. The first active material may specifically comprise vanadium nitride. The active material may have a high specific surface area of about 40 $m^2/g$ or greater. For example, vanadium nitride has a specific surface area of about 40 $m^2/g$ has been measured to have a capacity of about 200 F/g.

The supercapacitor 100 may be a pseudocapacitor or a hybrid capacitor having an asymmetric cell design. Asymmetric device architecture has been previously demonstrated, where two different types of electrode materials, for example, a supercapacitor-type electrode and a battery-type electrode are combined. The voltage windows in these devices are wider than those for conventional symmetric supercapacitors. Such an asymmetric cell design is described in U.S. Pat. No. 9,384,905, the content of which is incorporated herein by reference. Battery-type electrodes typically have galvanostatic charge-discharge shapes with detectable plateaus (see Jiang et al., "Definitions of Pseudocapacitive Materials: A Brief Review", *Energy & Environmental Materials* 2019, 2, 30-37).

If the supercapacitor 100 has an asymmetric cell design, the first electrode 102 and second electrode 104 can be selected to maximize the total operating window of the supercapacitor 100, that is to maximum the operating voltage range from negative voltages to positive voltages over which the asymmetric electrode can be cycled. By selection of an appropriate first electrode 102 and second electrode 104 active material pairing, the operating window of the supercapacitor 100 may be extended beyond the performance breakdown regions that would result when using the same active material on each electrode. The first electrode 102 and second electrode 104 may be selected such that the operating windows of the electrodes do not overlap more than 60% based on the voltage overlap. Other suitable overlaps include less than 58%, 56%, 54%, 52%, 50%, 48%, 46%, 44%, 42%, 40%, 35%, 30%, 25%, 20%, 15%, 10%, or 5%. The operating windows may have no overlapping voltage operating portions (termed 0% overlap). For example, the electrodes may have operating windows that abut, but not overlap.

For example, the second active material can be a metal oxide, such as, manganese oxide, ruthenium oxide, iridium oxide, cobalt oxide, and nickel oxyhydroxide. The metal oxide can be a redox capacitive material. The second active material may specifically be activated carbon (AC), an electrical double layer capacitive material. The second active material can comprise a battery-type electrode material such as an intercalation host material (e.g., lithium titanate oxide or graphitic carbon). The second active material may be selected such that the overlap in operating windows of the first and second electrodes is not greater than 60% based on voltage.

The first current collector 112 and the second current collector 122 can comprise a conductive metal or any suitable conductive material. The active materials may be clad or coated onto the current conductors. Suitable current collector substrates upon which the first active material and/or second active materials can be coated to form the first and second electrodes include conductive materials such as glassy carbon, titanium, zirconium, tantalum, molybdenum, tungsten, and ruthenium oxide. Other suitable substrate materials include material selected from Groups III, IV, V, VI, VII, and VIII of the Periodic Table.

The operating window of a supercapacitor in accordance with embodiments of the disclosure can be greater than 3.6 V. For example, the operating window can be up to about 5 V. Supercapacitors in accordance with disclosure can have operating windows above, for example, of about 3, 3.5, 4, 4.1, 4.2, 4.3, 4.4, 4.5, 4.6, 4.7, 4.8, 4.9, 5, 5.1, 5.2, 5.3, 5.4, or 5.5 V. The supercapacitor may have a maximum energy density equal to or above 20, 30, 40, 50, 60, 70, 80, 90, or 100 Wh/kg. The supercapacitor may have a coulombic efficiency of at least 80%, or at least 85%, at least 90%, at least 95%, or at least 99%.

Traditionally, large potential windows have been achieved using an aqueous electrolyte. For example, traditional systems have used aqueous electrolytes such as potassium hydroxide, sodium hydroxide, ammonium hydroxide, lithium hydroxide, aqueous sulfuric acid, aqueous nitric acid, and aqueous phosphoric acid. However, the systems and methods of the present disclosure allow for significantly higher energy densities than achievable in previous aqueous electrolyte systems.

Due to the limited capacitance of activated carbon electrodes, the complete potential of previous supercapacitors has not been fully utilized. Combining both anode and cathode with pseudocapacitive behavior can significantly enhance the energy density, however, the choice of electrolyte becomes limited. The electrolyte system needs to have specific functional group in order to participate in the redox reaction on an electrode surface. Ionic liquids, such as the ionic liquid of the present disclosure, offer great flexibility in designing the ionic species with required functional groups. Hydrophobicity/hydrophilicity of ionic liquids can be controlled by tailoring the functional groups. This feature of ionic liquids helps to select either aqueous or organic solvents, which can further enhance the performance and cut the cost of the electrolyte.

In another aspect, the present disclosure provides an ionic liquid electrolyte configured to be used in a supercapacitor. The electrolyte may comprise a protic ionic liquid capable of undergoing a faradaic charge transfer with an electrode of a supercapacitor. The ionic liquid electrolyte may comprise a solvent. The protic ionic liquid and the solvent may have the same compositions and properties as those of the supercapacitor described herein.

Figure 2:
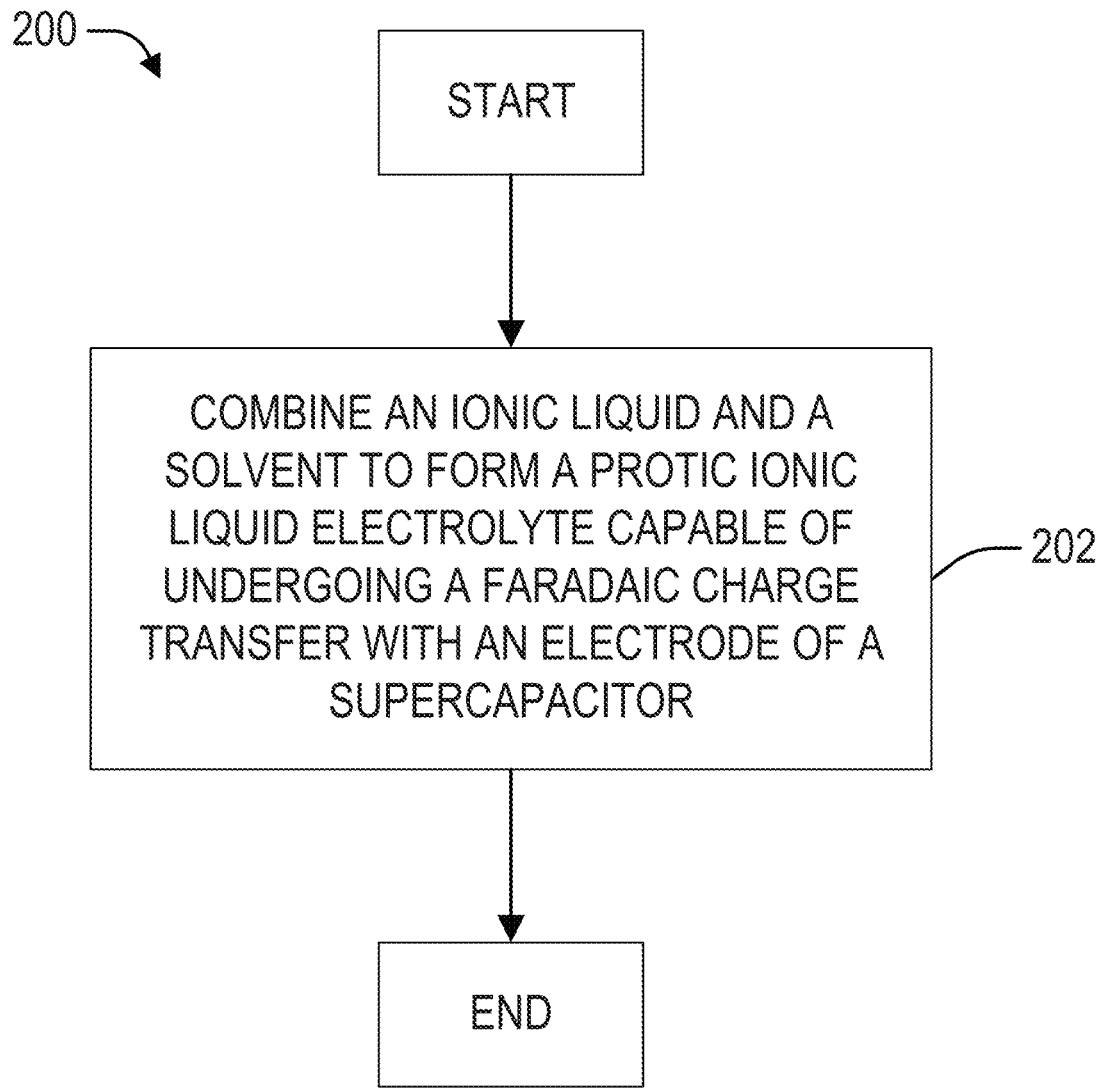
FIG. 2 is a flowchart representation of a method of making an ionic liquid electrolyte, in accordance with one aspect of the present disclosure.

FIG. 2 depicts a flowchart for a method 200 of making an ionic liquid electrolyte. The method 200 comprises a first step of combining an ionic liquid and a solvent to form a protic ionic liquid electrolyte capable of undergoing a faradaic charge transfer with an electrode of a supercapacitor. The ionic liquid and the solvent may have the same compositions and properties as those of the supercapacitor and ionic liquid electrolyte described herein.

EXAMPLES

The following examples are provided in order to demonstrate and further illustrate certain embodiments and aspects of the present disclosure and are not to be construed as limiting the scope of the disclosure.

Example 1

A study was conducted in order to evaluate the performance of a hybrid supercapacitor system with a vanadium nitride electrode and an ionic liquid electrolyte.

Electrode Preparation

High surface area vanadium nitride (VN) was synthesized via a temperature-programmed reaction of $V_2O_5$ (99.9%, Sigma Aldrich) with anhydrous $NH_3$ (99.99%, Cryogenic Gases). Activated carbon (AC) (20-40 mesh particle size, granular) was purchased from Sigma Aldrich. In one configuration, VN was used as the anode electrode and AC was used as the cathode electrode. In another configuration, VN was used as the cathode electrode and AC was used as the anode electrode Anode disc electrodes were prepared by coating titanium foils (99.7%, Aldrich) with slurries containing 97% of the active material (VN), 2% carbon black (Super P Li) and 1% polyvinylidene fluoride (Kynar, Arkema) in N-methyl-2-pyrrolidone (99.95%, Alfa Aesar) solvent. The target loading was ~7 mg of active material.

Cathode disc electrodes were prepared by coating titanium foils (99.7%, Aldrich) with slurries containing 85% of the active material (AC), 10% carbon black (Super P Li) and 5% polyvinylidene fluoride (Kynar, Arkema) in N-methyl-2-pyrrolidone (99.95%, Alfa Aesar) solvent. The loading was ~3.5 mg of active material.

The electrodes were dried under vacuum at 80° C. for 8 hr. The mass of the active material was determined by subtracting the mass of the titanium substrate from the mass of the dried coated electrode.

Electrolyte Preparation

The ionic liquid electrolytes were prepared in an argon-filled glove box, and consisted of a mixture of 1-ethyl-3-methylimidazolium bis (fluorosulfonyl) imide (EMIM FSI) and acetonitrile. The volume ratio was 1:1. To prepare the ionic liquid electrolytes, EMIM FSI was slowly added to acetonitrile with constant stirring until the desired volume composition is achieved.

Electrochemical Testing

Operating voltage windows, open circuit potentials (OCP), and capacitances for VN and AC electrodes were determined using cyclic voltammetry analysis. The experiments were carried out in a three-electrode electrochemical cell (ECC-Aqu, EL-Cell FmbH, Germany) using an Autolab PGSTAT302N potentiostat. The cells were assembled with 18 mm diameter glass fiber separators of thickness 1.55 mm. An 18 mm diameter counter electrode (Kynol activated carbon fabric ACC-507-15, 1500 $m^2 g^{-1}$, thickness 0.54 mm) was used. The working electrode diameter was restricted to 16 mm to ensure good current flow between the counter and working electrodes. A Pt wire (1 mm diameter) was used as a quasi-reference electrode. To ensure good wetting, the counter electrode and separator were soaked in the electrolyte overnight. All experiments were carried out in an argon-filled glove box.

Charge and discharge experiments were carried out for the VN-AC systems in a Swagelok cell to determine the energy density, cell voltage, and coulombic efficiency. The cells were assembled with disc electrodes of 12.7 mm diameter of VN and AC and a Celgard 3501 separator. Approximately, 1-3 ml of electrolyte was used for each experiment.

Results and Discussion

Figure 3A:
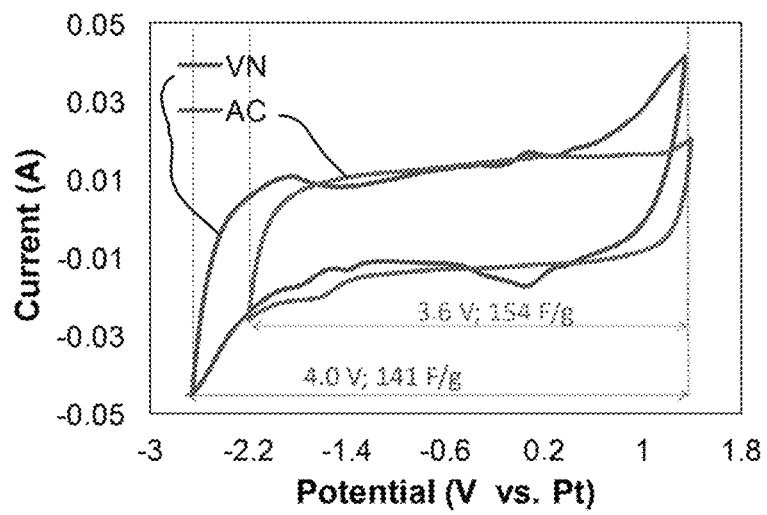
FIGS. 3A, 3B and 3C depict experimental results of an experimental hybrid supercapacitor system with an ionic liquid electrolyte.

Cyclic voltammograms for VN and AC in the mixture of EMIM FSI (50% volume) and acetonitrile (50% volume) electrolyte are shown in FIG. 3A; the voltage windows are 3.6 for AC and 4.0 V for VN. These values significantly exceeded those reported in aqueous electrolytes. High capacitances were obtained for both materials. The areal specific capacitance for VN was much higher than the expected value for double layer storage. This confirms our hypothesis that VN stores charges via a pseudocapacitive mechanism in ionic liquid electrolytes containing hydroxyls. The OCP are 0.177 V and 0.001 V for VN and AC, respectively.

Figure 3B:
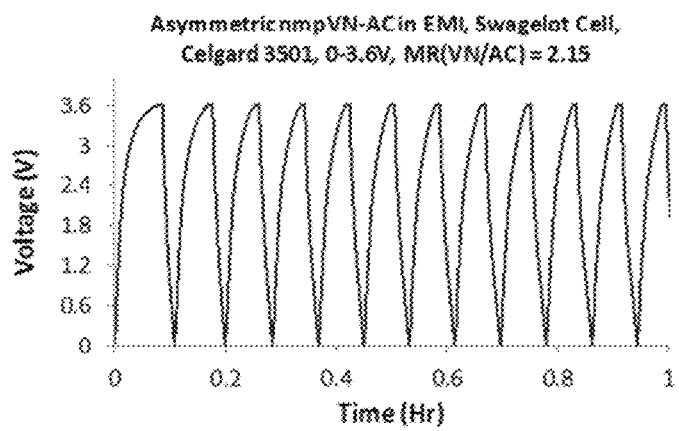
Figure 3C:
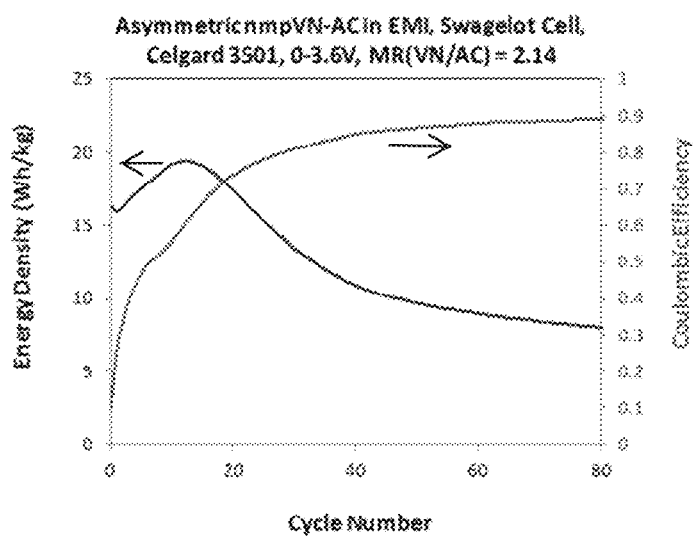

Charge and discharge experiments were performed on the VN-AC system in EMIM FSI (50% volume) and acetonitrile (50% volume) electrolyte. FIG. 3B shows the voltage as a function of time. A notably high cell voltage of up to 4.0 V was obtained from the cell. This value is much higher than that obtained from commercial supercapacitors made from activated carbon electrodes, which is ~2.85 V. High energy density of 20 Wh/kg was obtained from the system as shown in FIG. 3C. It is worth-mentioning that energy densities obtained from aqueous based electrolytes (not shown here) are much lower than those obtained in the ionic liquid electrolytes. Another important parameter to consider while examining supercapacitors is coulombic efficiency. Coulombic efficiency values close to unity (100%) indicates complete withdraw of the cell energy. For this system, we obtained 90% coulombic efficiency (FIG. 3C), comparable to those obtained from aqueous electrolytes.

We have demonstrated high voltage, high energy density supercapacitors based on pseudocapacitive materials (i.e. vanadium nitride) in an asymmetric cell configuration using ionic liquid as the electrolyte. These supercapacitors have advantages of high cell voltage and high energy density over currently available supercapacitors based on activated carbons in organic electrolytes. We used various ionic liquids including those based on 1-ethyl-3-methylimidazolium bis (fluorosulfonyl) imide (EMIM FSI) and acetonitrile as the electrolyte. One of the asymmetric cells comprised a vanadium nitride (negative electrode) and an activated carbon (positive electrode) which resulted in cell voltages as high as 4.0 V and energy densities of >20 Wh/kg (based on active material) due to high capacitances of individual electrode materials and their corresponding voltage windows. These cell voltages are 140% of the highest (2.85 V) reported for commercially available supercapacitor devises. Typically doubling the voltage window results in quadrupled increase in the energy based on the equation $E=CV^2$, where E is the energy, C is the capacitance and V is the cell voltage.

Prophetic Example A

As a prophetic example, we envision developing a prototype supercapacitor cell operating at a maximum voltage of 5 V and delivering an energy density of ~90 Wh/kg. This new approach of using ionic liquids containing hydroxyl group and protons has not previously been employed in pseudocapacitors or any other capacitor devices. These classes of ionic liquid can widen the operating voltage window and also enhance the pseudocapacitance.

Since the electrolytes participate in the redox reactions at the interface of the electrode, the capacitance can significantly vary depending on the type of electrode and electrolyte used. For instance, pseudocapacitance of vanadium nitride can vary by nearly 400% by changing the electrolyte from $[(C_2H_5)_4N](CF_3SO_3)$ to $(C_2H_5)_4NOH$. Presence of hydroxyl group (OH) may be central in utilizing the complete potential of a vanadium nitride electrode, which, without being bound by theory, undergoes series of reversible redox reactions through hydroxyl bonding confined to a few atomic layers of vanadium oxide on the surface of the underlying nitride nanocrystals. These new classes of ionic liquids are expected to harvest pseudocapacitance from vanadium nitride anode due to the presence of hydroxyl group and protons. Typically, activated carbon is used in most of the asymmetric supercapacitors.

Thus, the invention provides a supercapacitor having a first electrode comprising a first active material, a second electrode comprising a second active material, and an electrolyte comprising a protic ionic liquid. The protic ionic liquid may be capable of undergoing a faradaic charge transfer with an electrode of a supercapacitor.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

Various features and advantages of the invention are set forth in the following claims.

What is claimed is:

1. A supercapacitor comprising:
a first electrode comprising a first active material;
a second electrode comprising a second active material; and
an electrolyte comprising a protic ionic liquid,
wherein the ionic liquid is a salt in a liquid state, and
wherein the first active material comprises a pseudocapacitive material.

2. The supercapacitor of claim 1, wherein the pseudocapacitive material comprises a metal selected from the group consisting of molybdenum, vanadium, titanium, manganese, and ruthenium.

3. The supercapacitor of claim 2, the second active material comprises a pseudocapacitive material.

4. The supercapacitor of claim 2, wherein the second active material is an electrical double layer capacitive material.

5. The supercapacitor of claim 2, wherein the second active material is a redox capacitive material.

6. The supercapacitor of claim 2, wherein the second active material is a battery-type electrode material.

7. The supercapacitor of claim 2, wherein the first active material comprises vanadium nitride.

8. The supercapacitor of claim 1, wherein the first active material comprises a material selected from the group consisting of metal oxides, metal carbides, metal nitrides, polymeric materials, 2D transition metal dichalcogenides, 2D MXenes, and carbon.

9. The supercapacitor of claim 1, wherein the first electrode has a first operating window, the second electrode has a second operating window, and the total operating window for the supercapacitor is greater than 3 volts.

10. The supercapacitor of claim 1, wherein the electrolyte comprises a compound having at least one hydroxyl moiety.

11. The supercapacitor of claim 10, wherein the electrolyte comprises an organic solvent.

12. The supercapacitor of claim 1, wherein the electrolyte comprises a compound selected from the group consisting of
1-ethyl-3-methylimidazolium bis (fluorosulfonyl) imide (EMIM FSI),
1-methylimidazolium acetate,
2-methylpyridine, trifluoroacetic acid,
1-[(2-methacryloyloxy)ethyl]-3-butylimidazolium hydroxide (MEBIm-OH),
methyl methacrylate (MMA),
choline hydroxide ($[OH-(CH_2)_2-NMe_3]^+OH^-$),
1-alkyl-3-methylimidazolium hydroxides,
tetra-n-butylphosphonium hydroxide,
1-butyl-3-methyl imidazolium hydroxide ([bmim]OH),
1-ethyl-3-methylimidazolium hydroxide ([emim]OH),
and mixtures thereof.

13. The supercapacitor of claim 1, wherein the supercapacitor is an asymmetric supercapacitor.

14. The supercapacitor of claim 1, wherein the supercapacitor has a maximum energy density of 20 Wh/kg or greater.

15. The supercapacitor of claim 1, wherein the supercapacitor has a coulombic efficiency of at least 80%.

16. The supercapacitor of claim 1, wherein the salt has a melting point below 50° C.

17. A supercapacitor comprising:
an electrode; and
an ionic liquid electrolyte comprising a protic ionic liquid capable of undergoing a faradaic charge transfer with the electrode,
wherein the ionic liquid is a salt in a liquid state, and
wherein the electrode comprises a pseudocapacitive material.

18. The supercapacitor of claim 17, wherein the protic ionic liquid comprises a compound having at least one hydroxyl moiety or protons.

19. The supercapacitor of claim 18, wherein the ionic liquid electrolyte further comprises an organic solvent.

20. The supercapacitor of claim 17, wherein the protic ionic liquid comprises a compound selected from the group consisting of
1-ethyl-3-methylimidazolium bis (fluorosulfonyl) imide (EMIM FSI),
1-methylimidazolium acetate,
2-methylpyridine, trifluoroacetic acid,
1-[(2-methacryloyloxy)ethyl]-3-butylimidazolium hydroxide (MEBIm-OH),
methyl methacrylate (MMA),
choline hydroxide ($[OH-(CH_2)_2-NMe_3]^+OH^-$),
1-alkyl-3-methylimidazolium hydroxides,
tetra-n-butylphosphonium hydroxide,
1-butyl-3-methyl imidazolium hydroxide ([bmim]OH),
1-ethyl-3-methylimidazolium hydroxide ([emim]OH),
and mixtures thereof.

21. The supercapacitor of claim 17, wherein the protic ionic liquid comprises 1-ethyl-3-methylimidazolium bis (fluorosulfonyl) imide (EMIM FSI).

22. The supercapacitor of claim 17, wherein the pseudocapacitive material comprises a metal selected from the group consisting of molybdenum, vanadium, titanium, manganese, and ruthenium.

23. The supercapacitor of claim 17, wherein the pseudocapacitive material has a specific surface area of 40 $m^2/g$ or greater.

24. The supercapacitor of claim 17, wherein the pseudocapacitive material comprises vanadium nitride.

25. The supercapacitor of claim 17, wherein the supercapacitor has a maximum energy density of 50 Wh/kg or greater.

26. The supercapacitor of claim 17, wherein the salt has a melting point below 50° C.

27. A method of making an ionic liquid electrolyte, the method comprising:
combining an ionic liquid and a solvent to form a protic ionic liquid electrolyte capable of undergoing a faradaic charge transfer with an electrode of a supercapacitor,
wherein the ionic liquid is a salt in a liquid state, and
wherein the electrode comprises a pseudocapacitive material.

28. The method of claim 27, wherein the ionic liquid comprises a compound having at least one hydroxyl moiety or protons, and the solvent is an organic solvent.

29. The method of claim 27, wherein the ionic liquid comprises a compound selected from the group consisting of
1-ethyl-3-methylimidazolium bis (fluorosulfonyl) imide (EMIM FSI),
1-methylimidazolium acetate,
2-methylpyridine, trifluoroacetic acid,
1-[(2-methacryloyloxy)ethyl]-3-butylimidazolium hydroxide (MEBIm-OH),
methyl methacrylate (MMA),
choline hydroxide ($[OH-(CH_2)_2-NMe_3]^+OH^-$),
1-alkyl-3-methylimidazolium hydroxides,
tetra-n-butylphosphonium hydroxide,
1-butyl-3-methyl imidazolium hydroxide ([bmim]OH),
1-ethyl-3-methylimidazolium hydroxide ([emim]OH),
and mixtures thereof.

30. The method of claim 27, wherein the salt has a melting point below 50° C.

* * * * *